Figure 4:
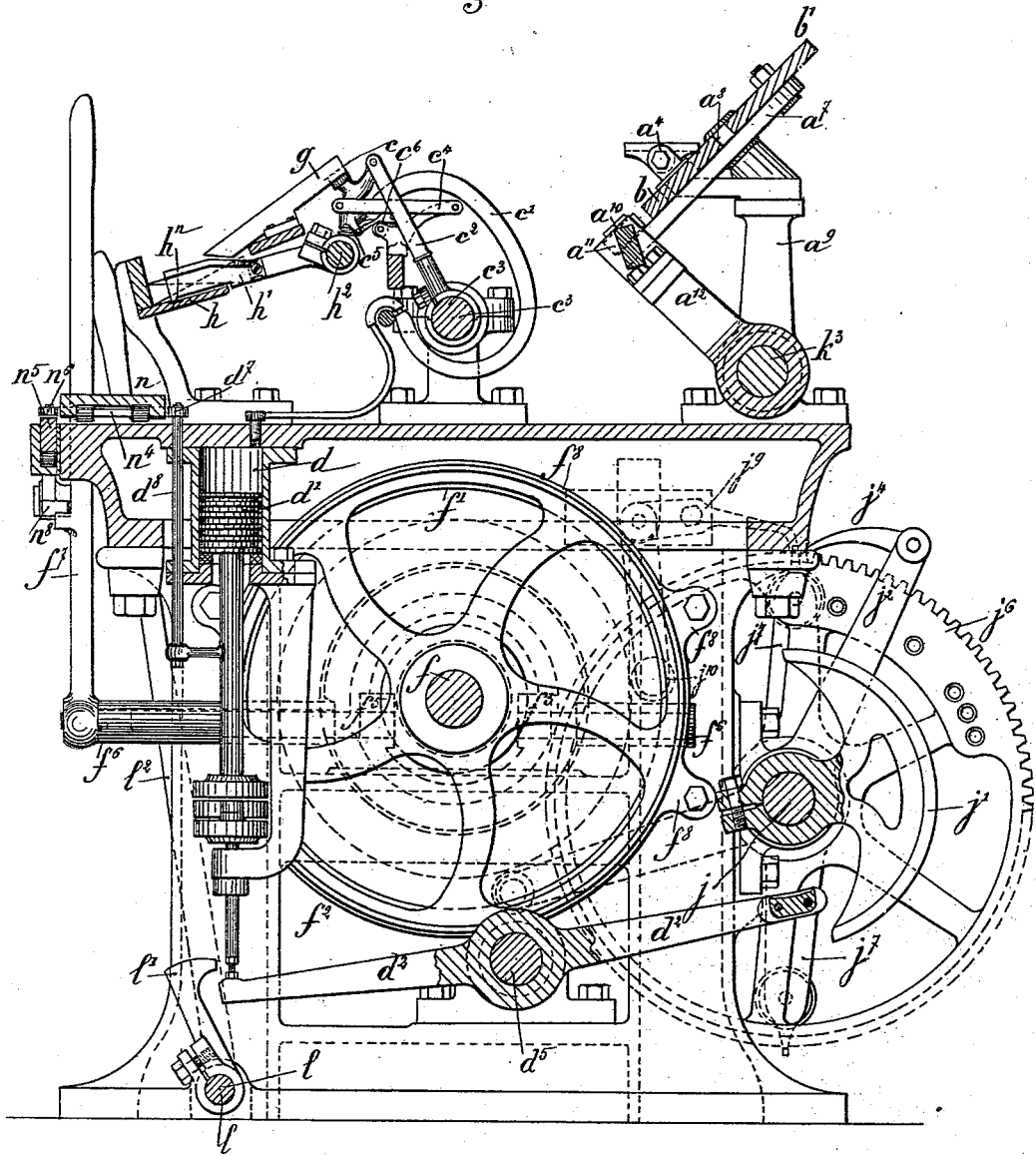

(No Model.) 19 Sheets—Sheet 1.
P. GAUCHOT.
MACHINERY FOR COMPOSING PLAYING CARDS IN PACKS.
No. 420,194. Patented Jan. 28, 1890.
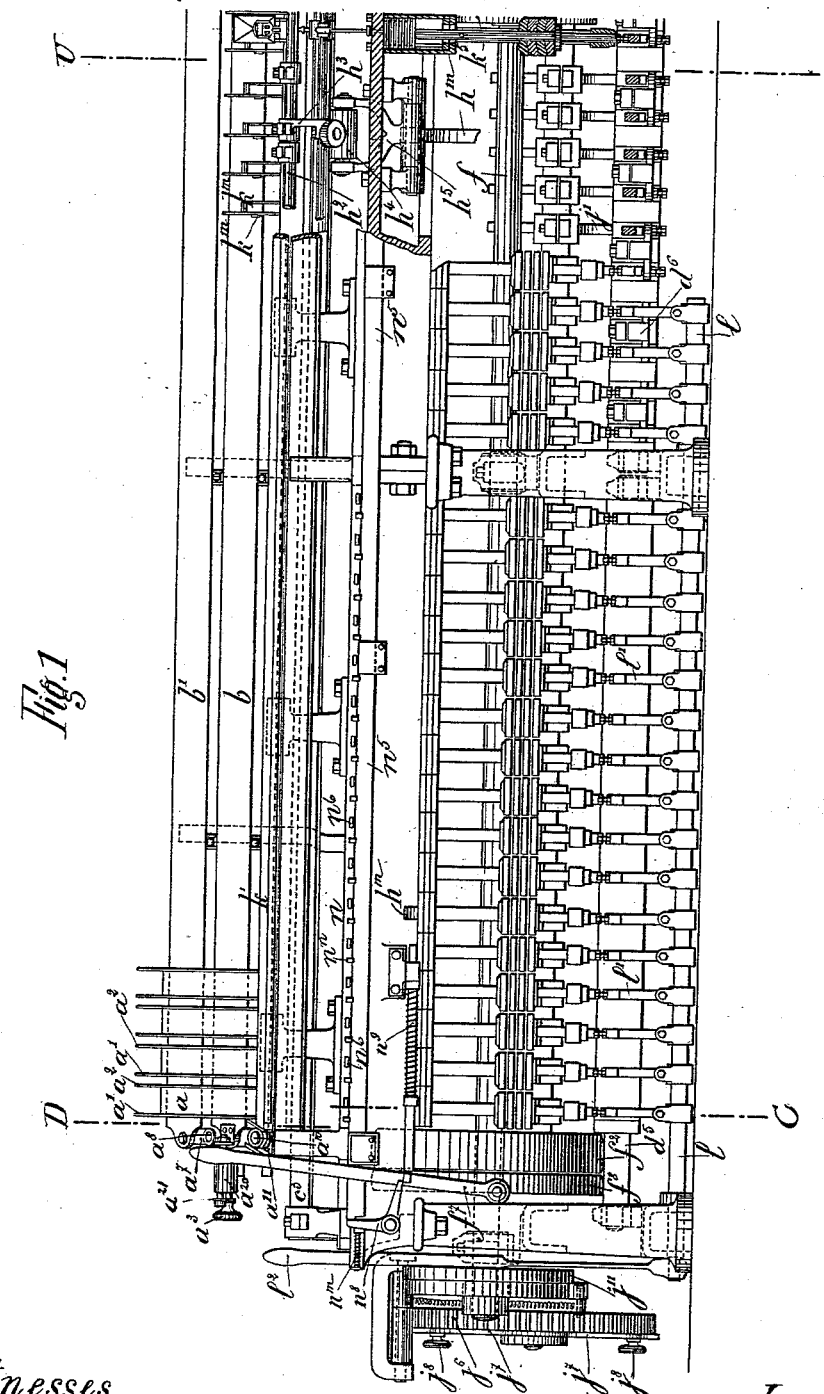
Witnesses
John Bicker
F. Bergengren
Inventor
Paul Gauchot
by Attorney
Henry T. Brown

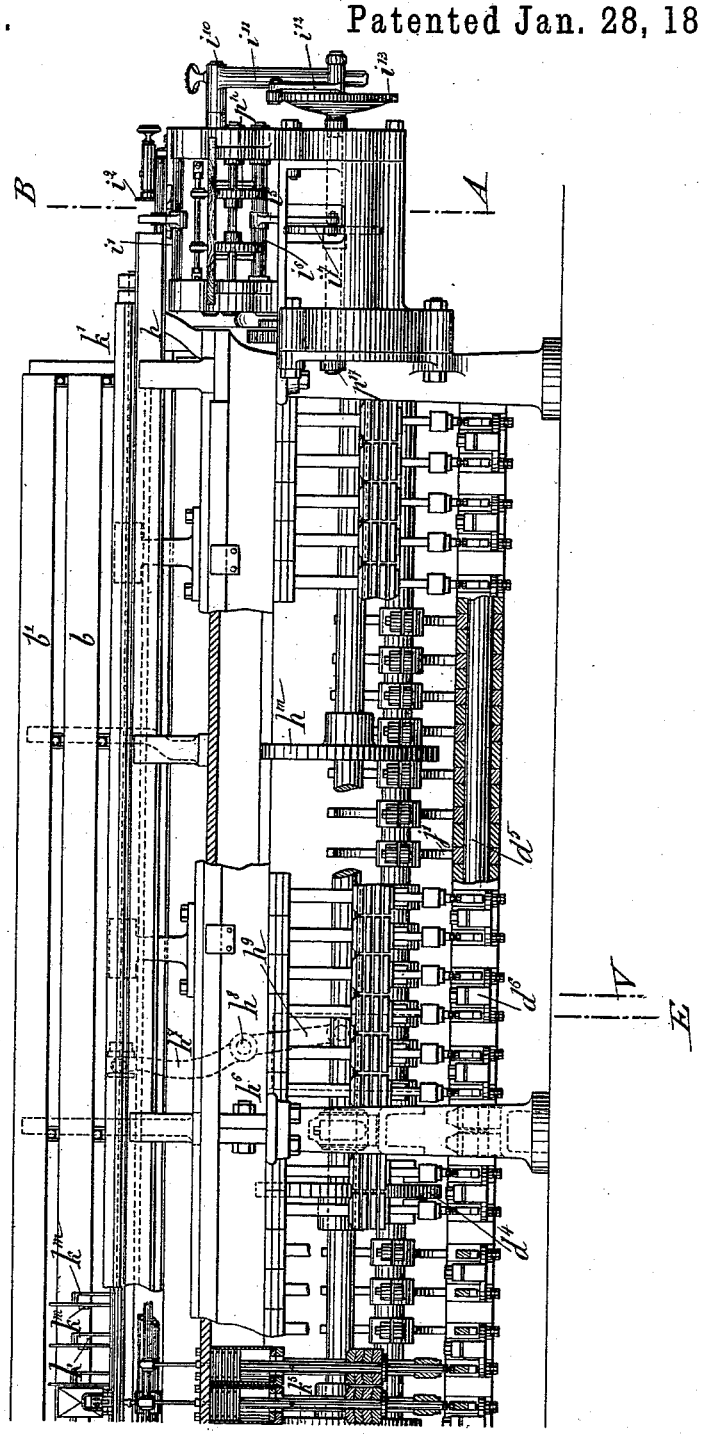

(No Model.) 19 Sheets—Sheet 3.
P. GAUCHOT.
MACHINERY FOR COMPOSING PLAYING CARDS IN PACKS.
No. 420,194. Patented Jan. 28, 1890.
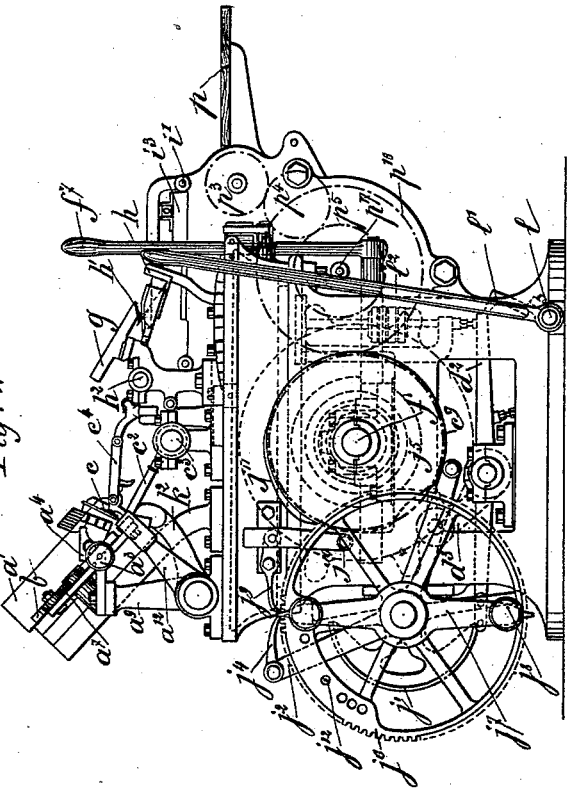
Fig. 2
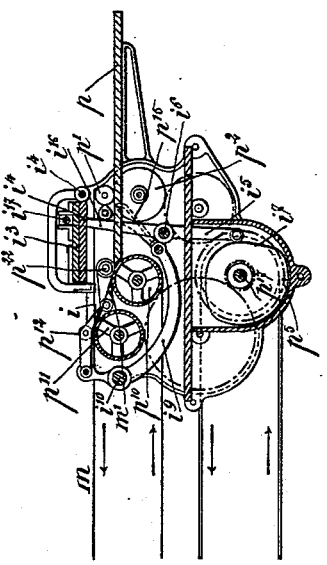
Fig. 1ᵃ
Witnesses
Inventor
Paul Gauchot
by Attorney
Henry T. Brown

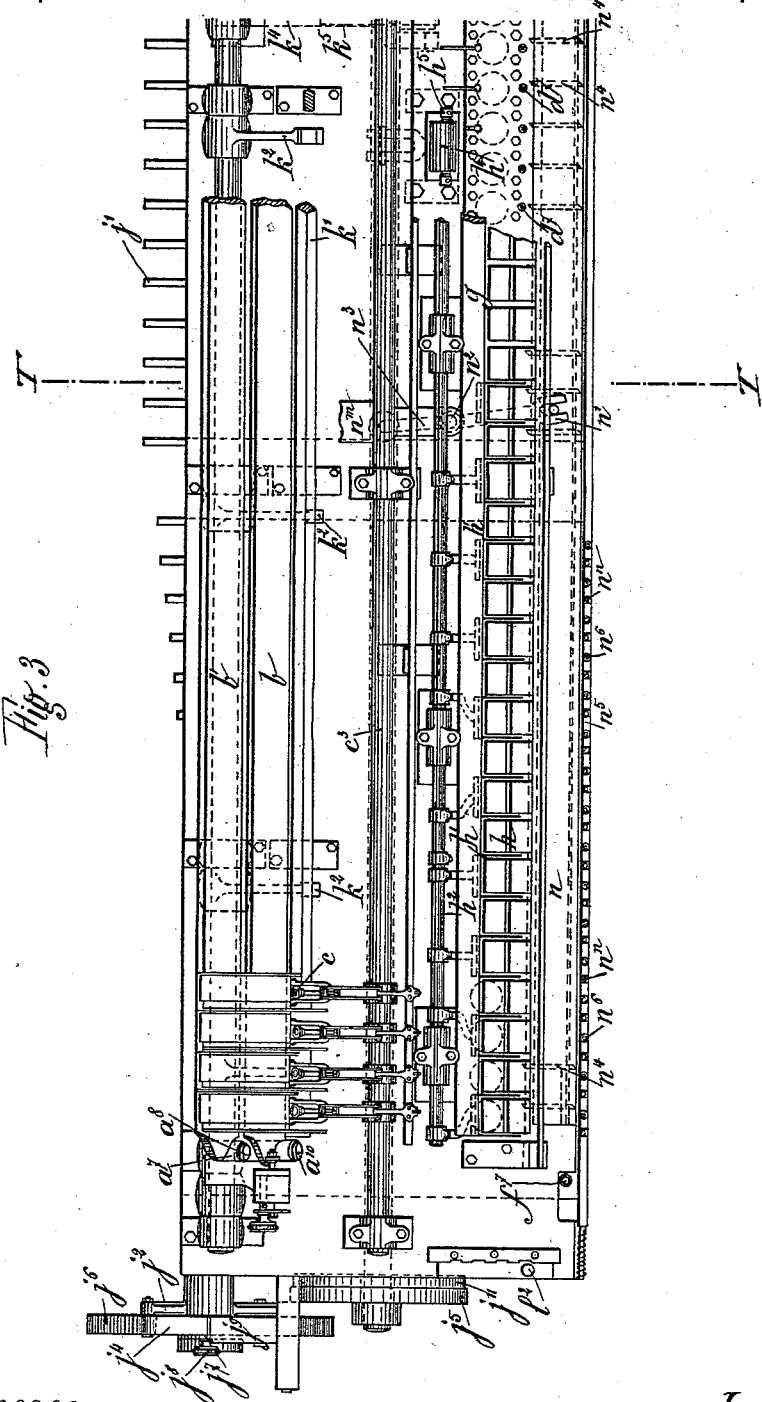

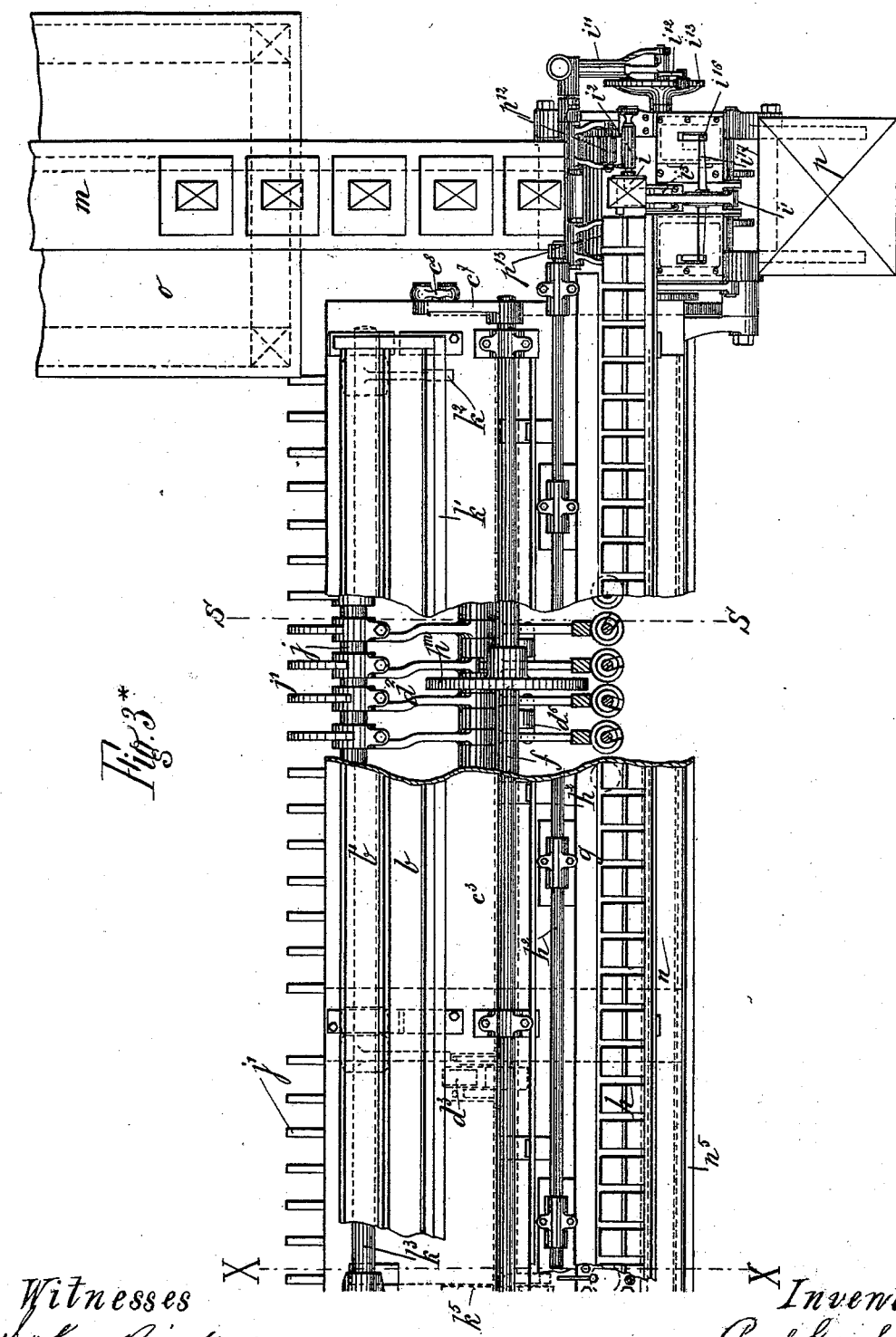

(No Model.) 19 Sheets—Sheet 6.
P. GAUCHOT.
MACHINERY FOR COMPOSING PLAYING CARDS IN PACKS.
No. 420,194. Patented Jan. 28, 1890.

Witnesses
Inventor
Paul Gauchot
by Attorney
Henry T. Brown (No Model.)　　　　　　　　　　　　19 Sheets—Sheet 9.
P. GAUCHOT.
MACHINERY FOR COMPOSING PLAYING CARDS IN PACKS.

No. 420,194.　　　　　　　Patented Jan. 28, 1890.

Witnesses
John Bicker
Jr. Bergengren

Inventor
Paul Gauchot
by Attorney
Henry T. Brown (No Model.) 19 Sheets—Sheet 11.
P. GAUCHOT.
MACHINERY FOR COMPOSING PLAYING CARDS IN PACKS.
No. 420,194. Patented Jan. 28, 1890.

Witnesses
John Bicker
F. Bergengren

Inventor
Paul Gauchot
by Attorney
Henry T. Brown (No Model.) 19 Sheets—Sheet 12.

P. GAUCHOT.
MACHINERY FOR COMPOSING PLAYING CARDS IN PACKS.

No. 420,194. Patented Jan. 28, 1890.

Witnesses

Inventor
Paul Gauchot
by Attorney

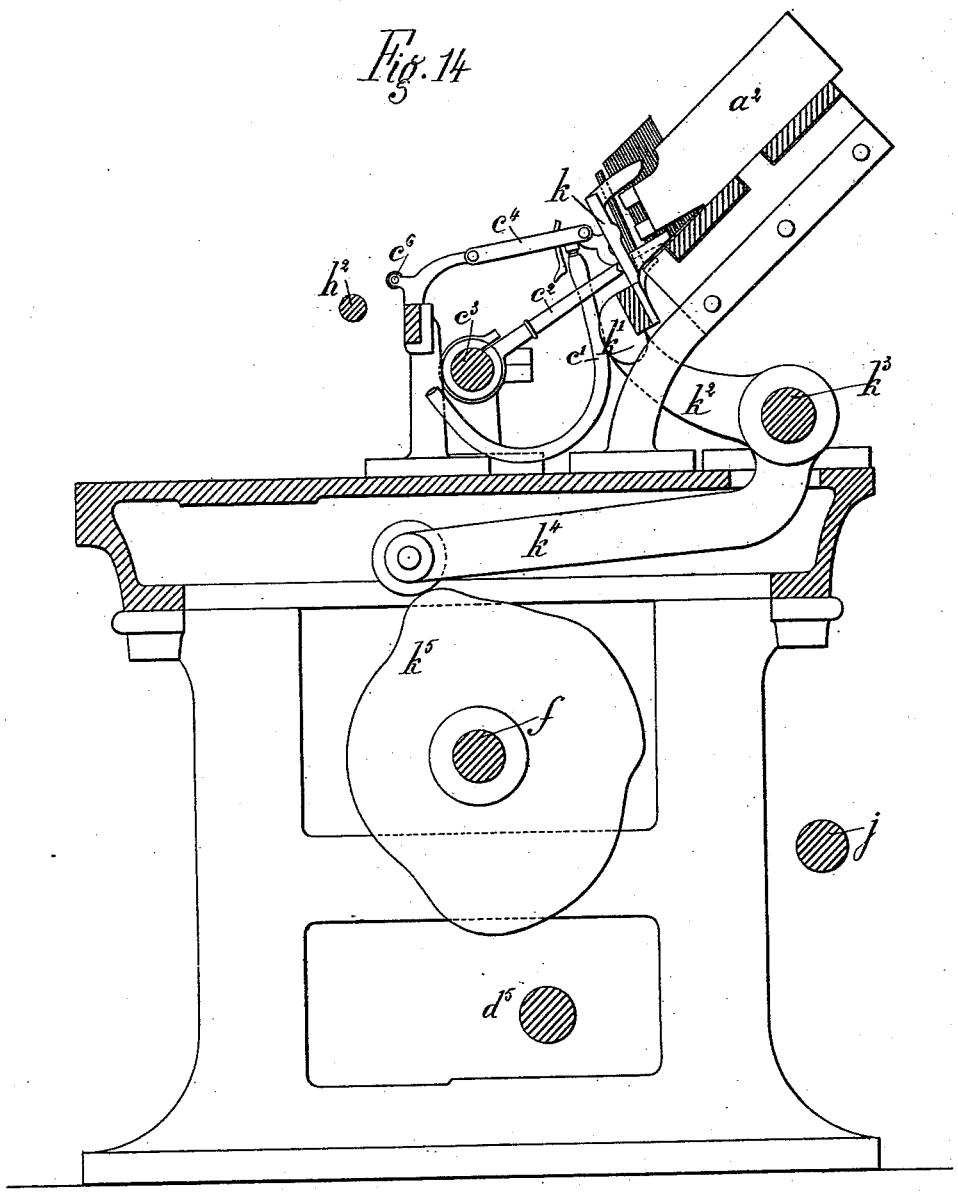

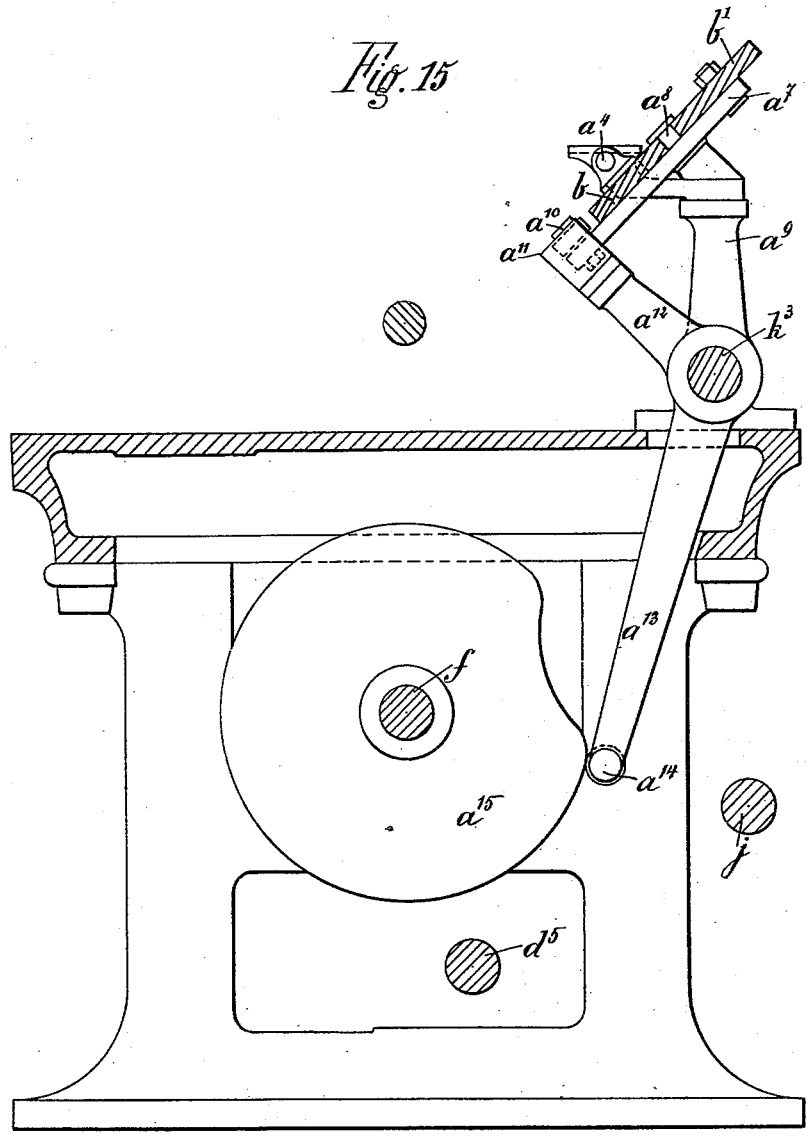

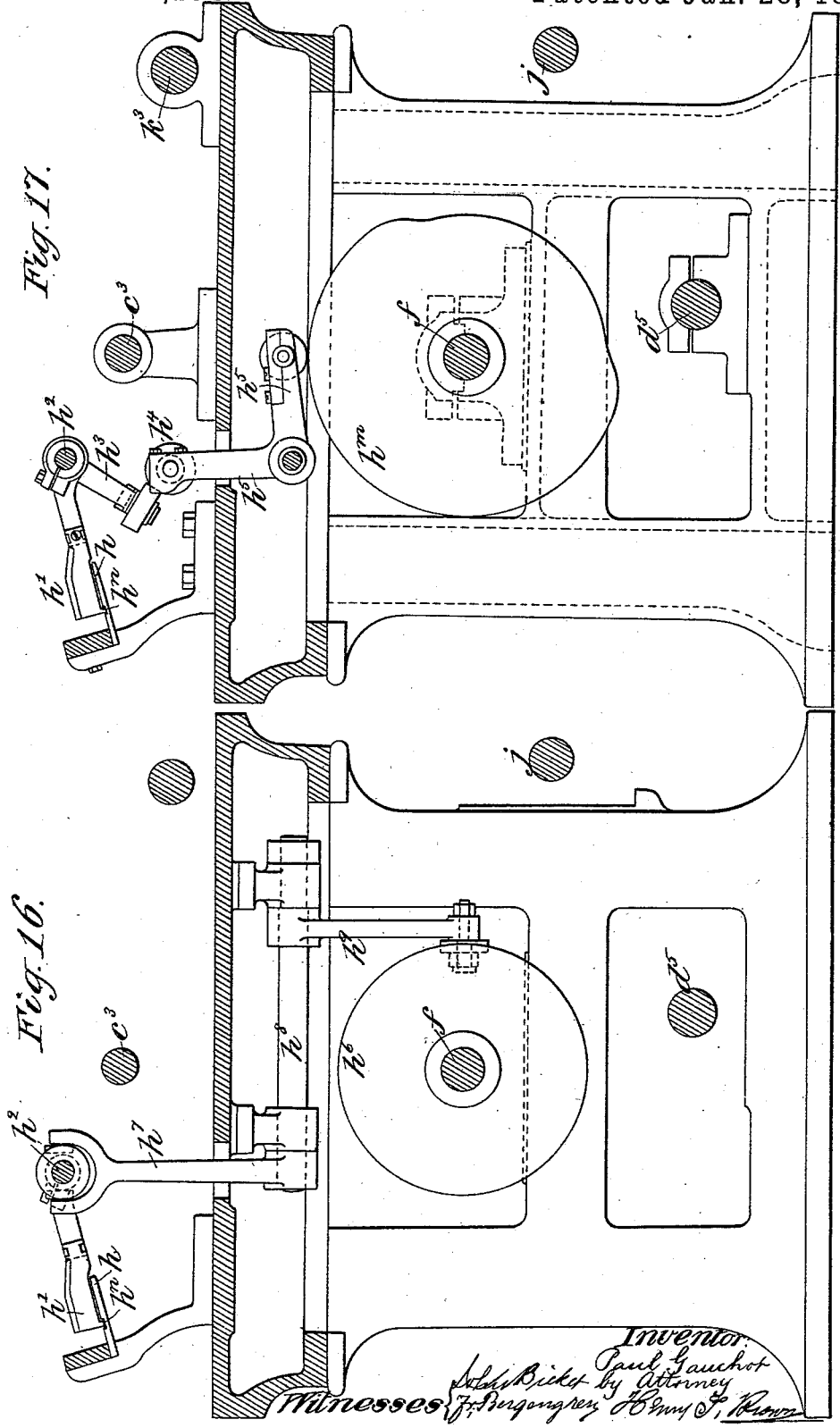

(No Model.) 19 Sheets—Sheet 16.
P. GAUCHOT.
MACHINERY FOR COMPOSING PLAYING CARDS IN PACKS.
No. 420,194. Patented Jan. 28, 1890.

Witnesses
John Dieker
Fr. Bergengrey

Inventor
Paul Gauchot
by Attorney
Henry T. Brown (No Model.)

19 Sheets—Sheet 17.

P. GAUCHOT.

MACHINERY FOR COMPOSING PLAYING CARDS IN PACKS.

No. 420,194.  Patented Jan. 28, 1890.

Witnesses

Inventor
Paul Gauchot
by Attorney
Henry T. Brown (No Model.) 19 Sheets—Sheet 19.
P. GAUCHOT.
MACHINERY FOR COMPOSING PLAYING CARDS IN PACKS.

No. 420,194. Patented Jan. 28, 1890.

Witnesses:

Inventor
Paul Gauchot

UNITED STATES PATENT OFFICE.

PAUL GAUCHOT, OF PARIS, FRANCE, ASSIGNOR OF ONE-HALF TO GRIMAUD & CHARTIER, OF SAME PLACE.

MACHINERY FOR COMPOSING PLAYING-CARDS IN PACKS.

SPECIFICATION forming part of Letters Patent No. 420,194, dated January 28, 1890.

Application filed December 3, 1887. Serial No. 256,921. (No model.) Patented in France October 19, 1887, No. 186,478; in Belgium October 19, 1887, No. 79,294; in England October 19, 1887, No. 14,225; in Germany October 20, 1887, No. 47,155; in Italy November 29, 1887, XXI, 22,464, XLIV, 256, and in Austria-Hungary August 20, 1888, No. 12,966 and No. 28,585.

*To all whom it may concern:*

Be it known that I, PAUL GAUCHOT, a citizen of the Republic of France, residing at Paris, in said Republic, have invented a new and useful Improvement in Machinery for Composing Playing-Cards in Packs, (for which I have obtained a brevet d' invention in France, No. 186,478, dated October 19, 1887; a brevet d' invention in Belgium, No. 79,294, dated October 19, 1887; a brevet d' invention in Italy, XXI, 22,464, XLIV, 256, dated November 29, 1887; a patent of the Empire of Germany, No. 47,155, dated October 20, 1887; a patent in Austria-Hungary, No. 12,966 and No. 28,585, dated August 20, 1888, and Letters Patent in Great Britain, No. 14,225, dated October 19, 1887,) of which the following is a specification, reference being had to the accompanying drawings.

The work to be done by the machine which constitutes the subject-matter of this invention is that of taking one card from each of a number of boxes corresponding with the number of cards in a pack to be produced and each containing cards of only one of the several denominations which constitute the pack and arranging and delivering the cards so taken in a pack. A card from one box having been deposited, it is advanced to position in front of another box, from which another card is deposited upon it, while a new card is deposited at a distance from it from the first box, which in turn is advanced to receive a card from the second box, while the cards previously received from the first and second boxes are advanced to the second and third boxes, respectively, to receive cards therefrom, and so on from the first to the last box.

There are several difficulties to be encountered in such operations as above mentioned, namely: First, the cards in the boxes from which they are to be taken to form the packs have a tendency to follow each other in the movement which is only intended to be given to one of them, which makes false packs; second, the device which takes the cards from the boxes to deposit them on the packs may accidentally fail to take a card, which produces incomplete packs; third, the liability of the cards in the boxes to become exhausted and the failure to replenish the boxes; fourth, that the machine is required to compose packs of different numbers—as thirty-two, thirty-six, and fifty-two—according to the game to be played.

My improvement includes means of obviating or overcoming these difficulties.

The invention also embraces means of taking the completed packs of cards from the machine, depositing them on wrappers, and delivering them on the said wrappers to a convenient point or points where attendants are stationed to receive them and fold the wrappers around the packs. The boxes are arranged side by side in a row. Each box receives cards of one denomination only, the cards being different in the several boxes, so that one card from each box will form a complete pack.

The purpose of the machine is to take one card from each box and to arrange it in proper order in a pack in process of formation, then to cause the pack to move forward one step after the reception of each card, to cause it to pass successively in front of all the boxes, and to receive one card from each in such manner that the pack arrives complete at the end of the machine.

Figure 5:
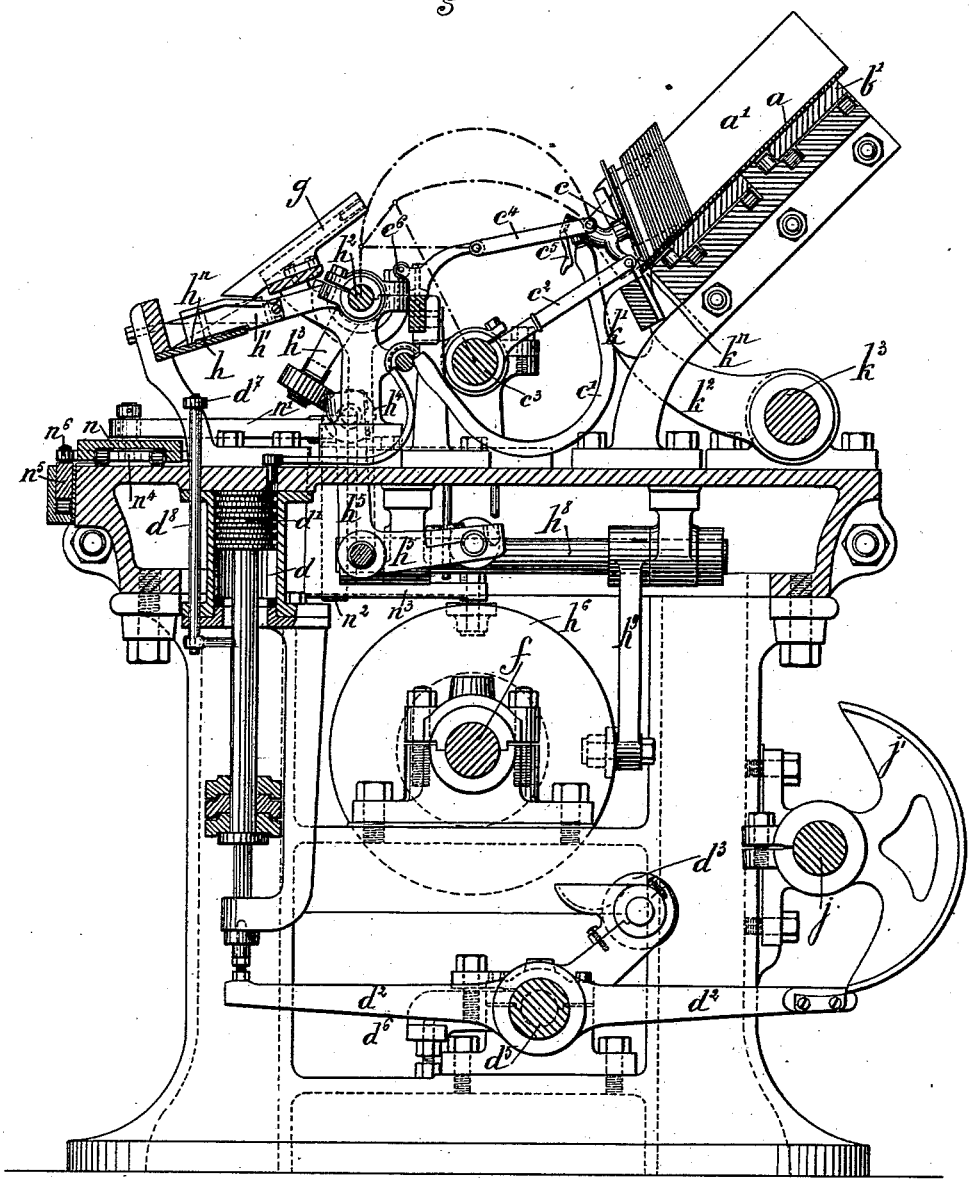

In the accompanying drawings, Figures 1 and 1* together represent a longitudinal elevation of the machine partly in section, Fig. 1 showing the left-hand half of the machine and Fig. 1* the right-hand half thereof. Fig. 1ª represents a transverse section in the line A B, Fig. 1*, looking toward the right of the mechanism, for placing the envelopes and the packs of cards upon the endless apron which carries them to the attendants to be wrapped up. Fig. 2 is a left-hand view of the machine. Figs. 3 and 3* represent together a plan of the machine, Fig. 3 representing the left-hand half and Fig. 3* the right-hand half of the machine. Fig. 4 represents a transverse section on a larger scale than the preceding figures in the line C D of Fig. 1. Fig. 5 is a similar section in the line E F, Fig. 1*. Fig.

Figure 6:
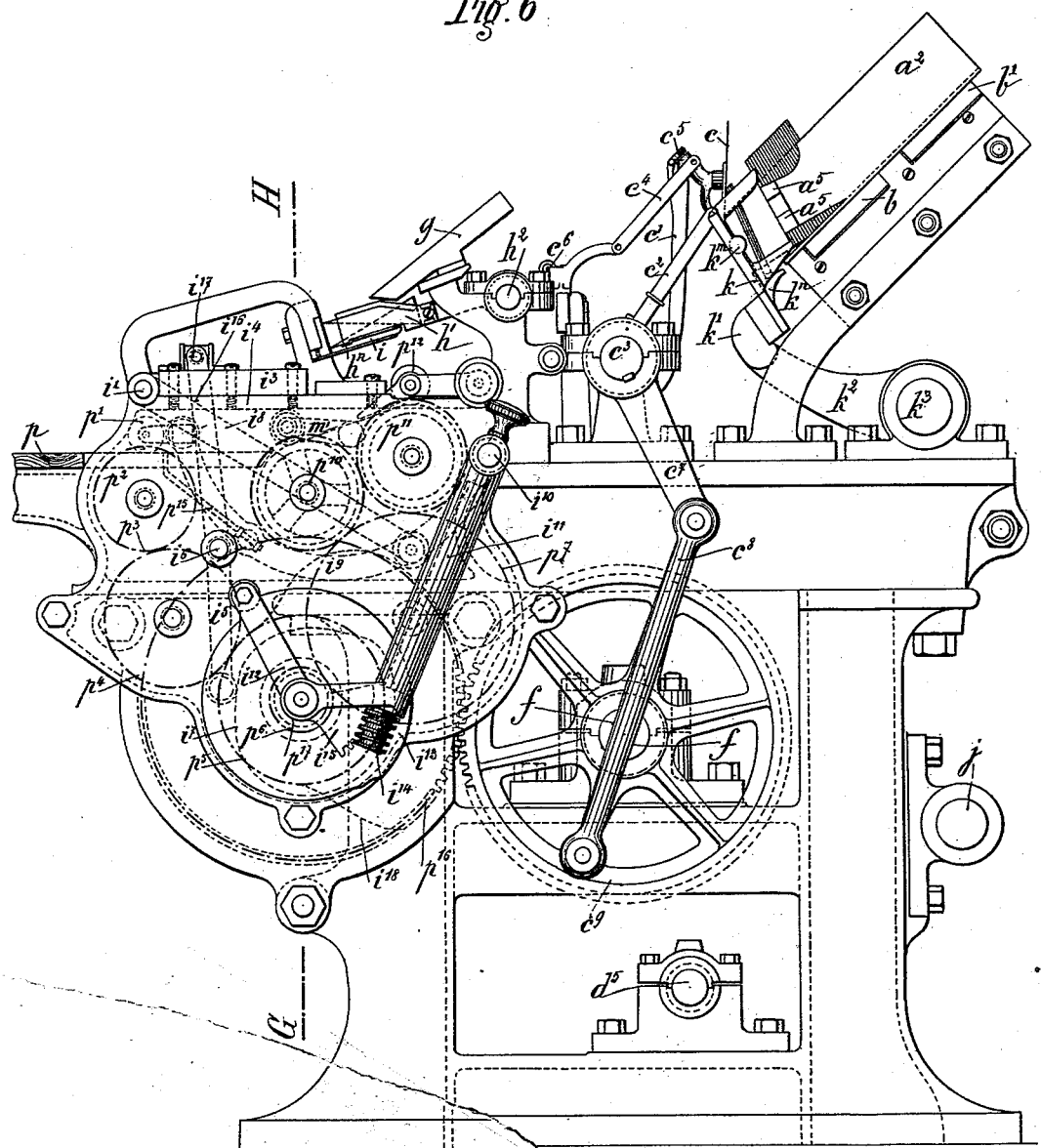
Figure 7:
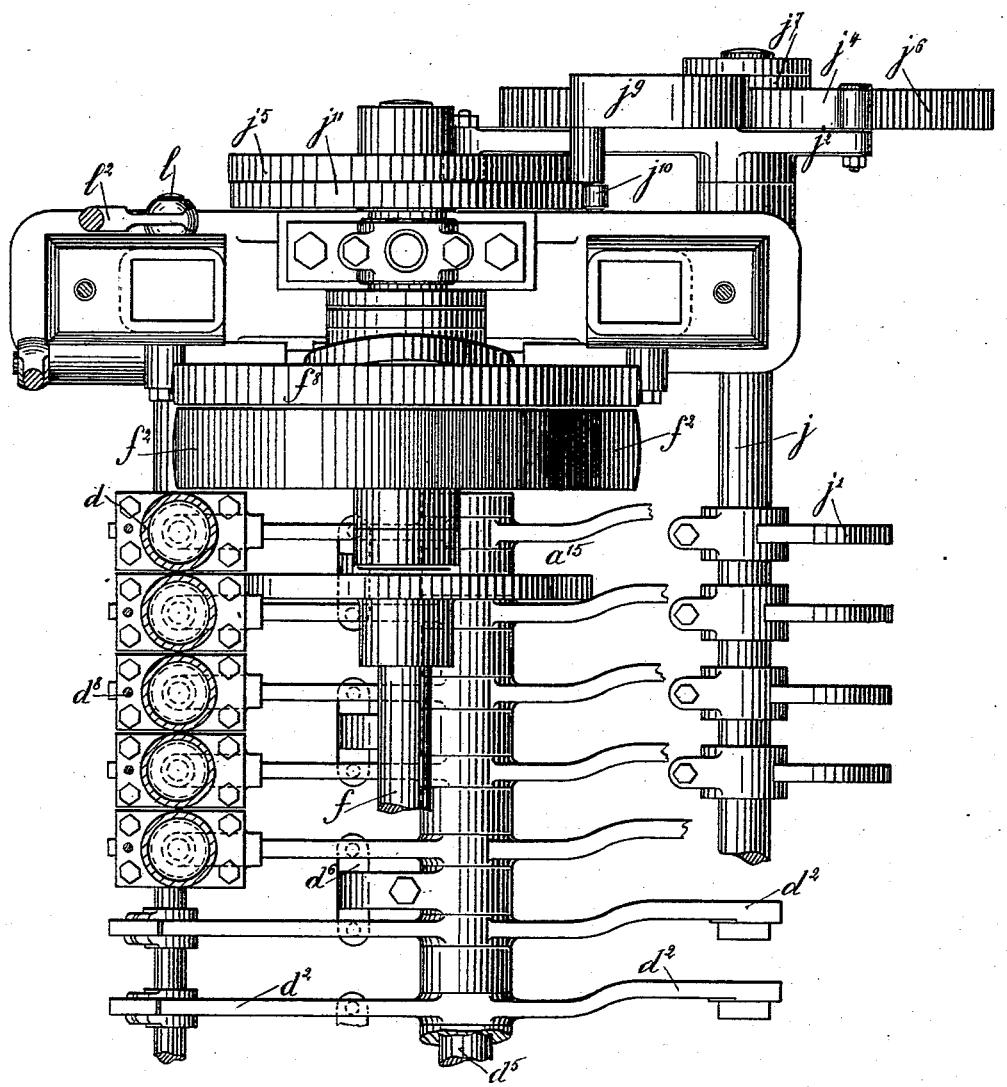
Figure 8:
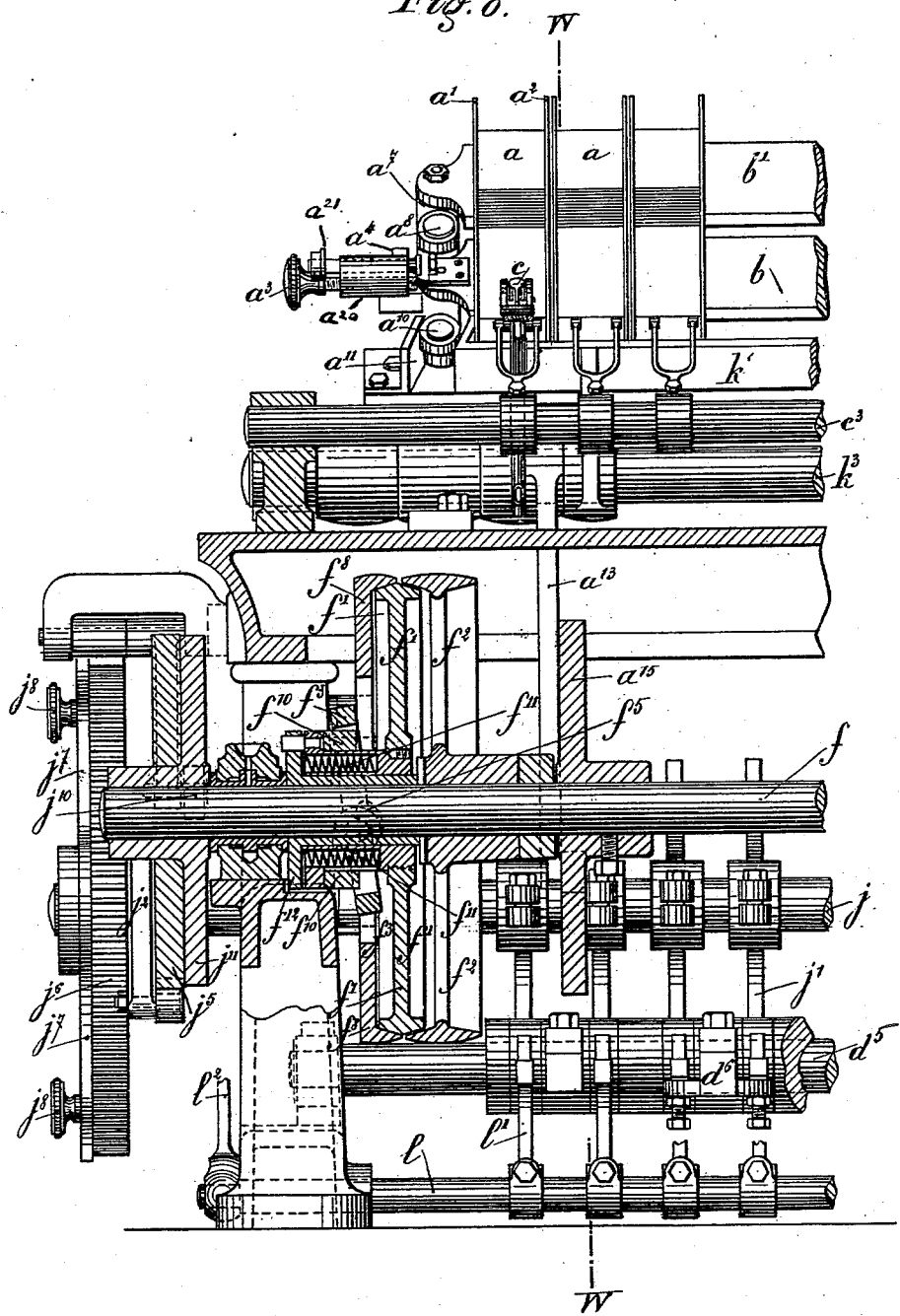
Figure 9:
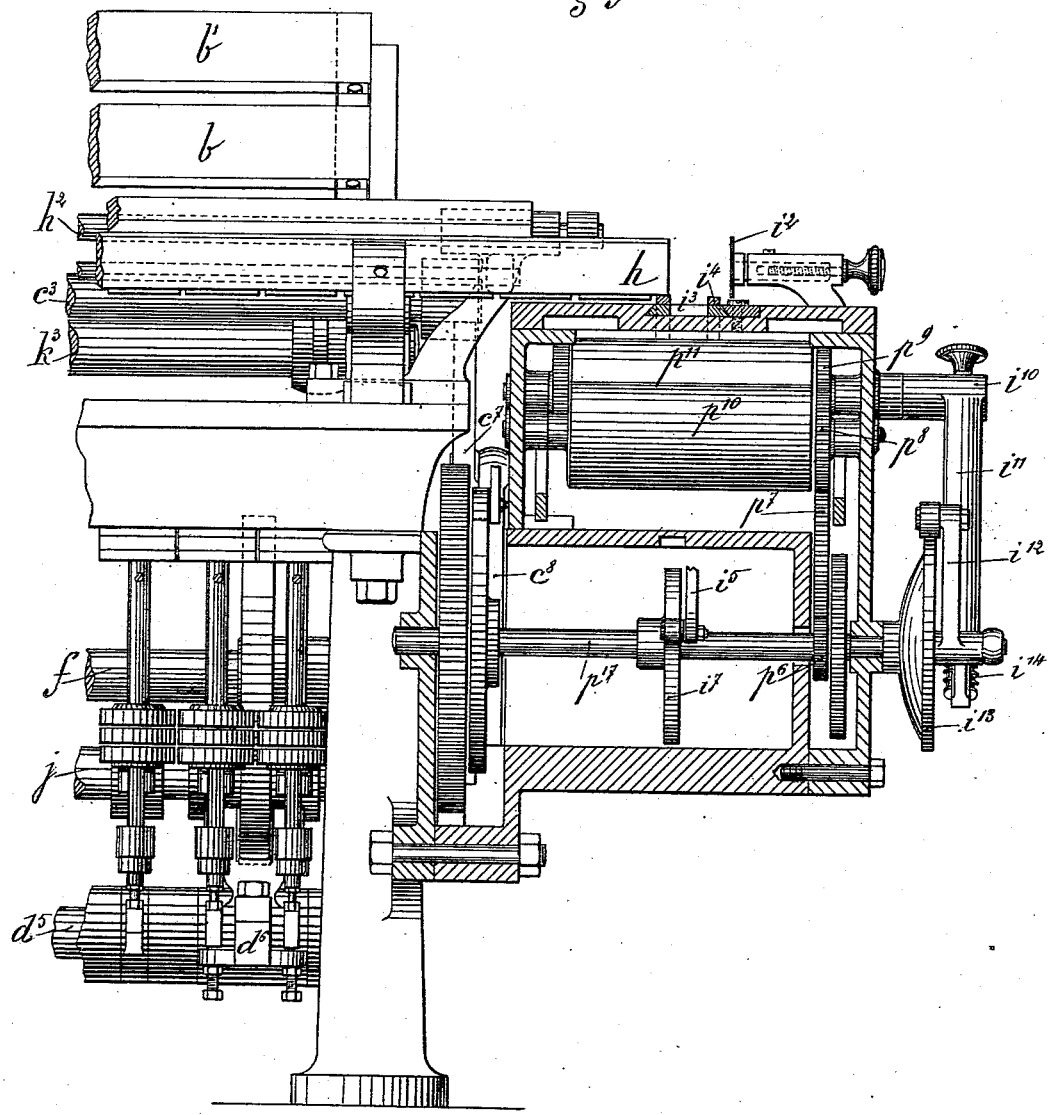
Figure 10:
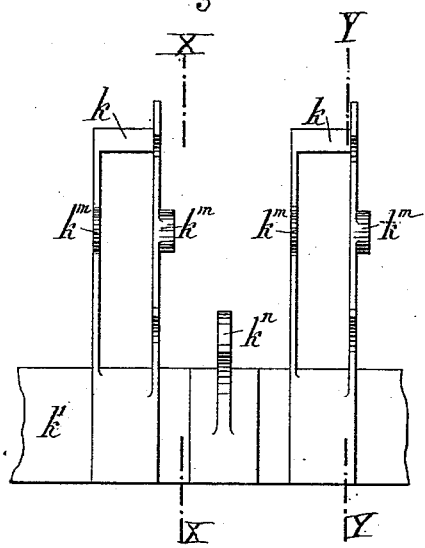
Figure 12:
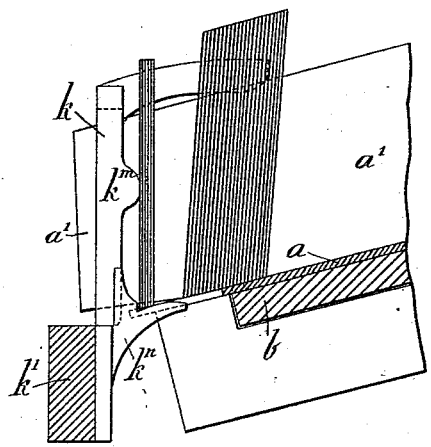
Figure 11:
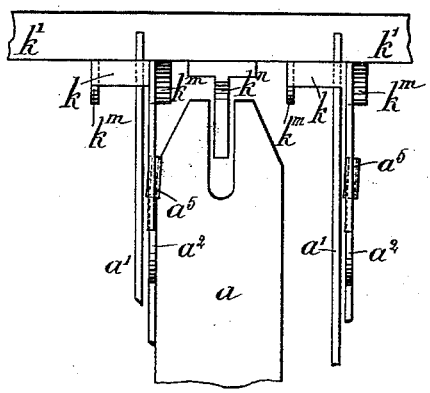
Figure 13:
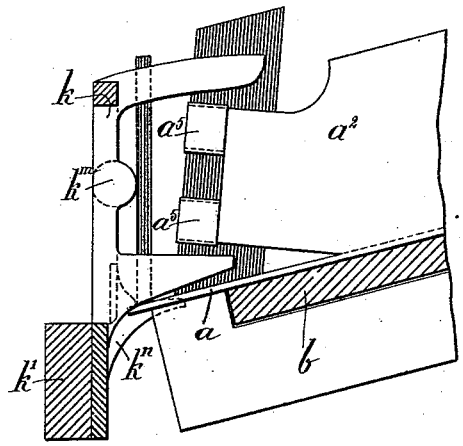
Figure 18:
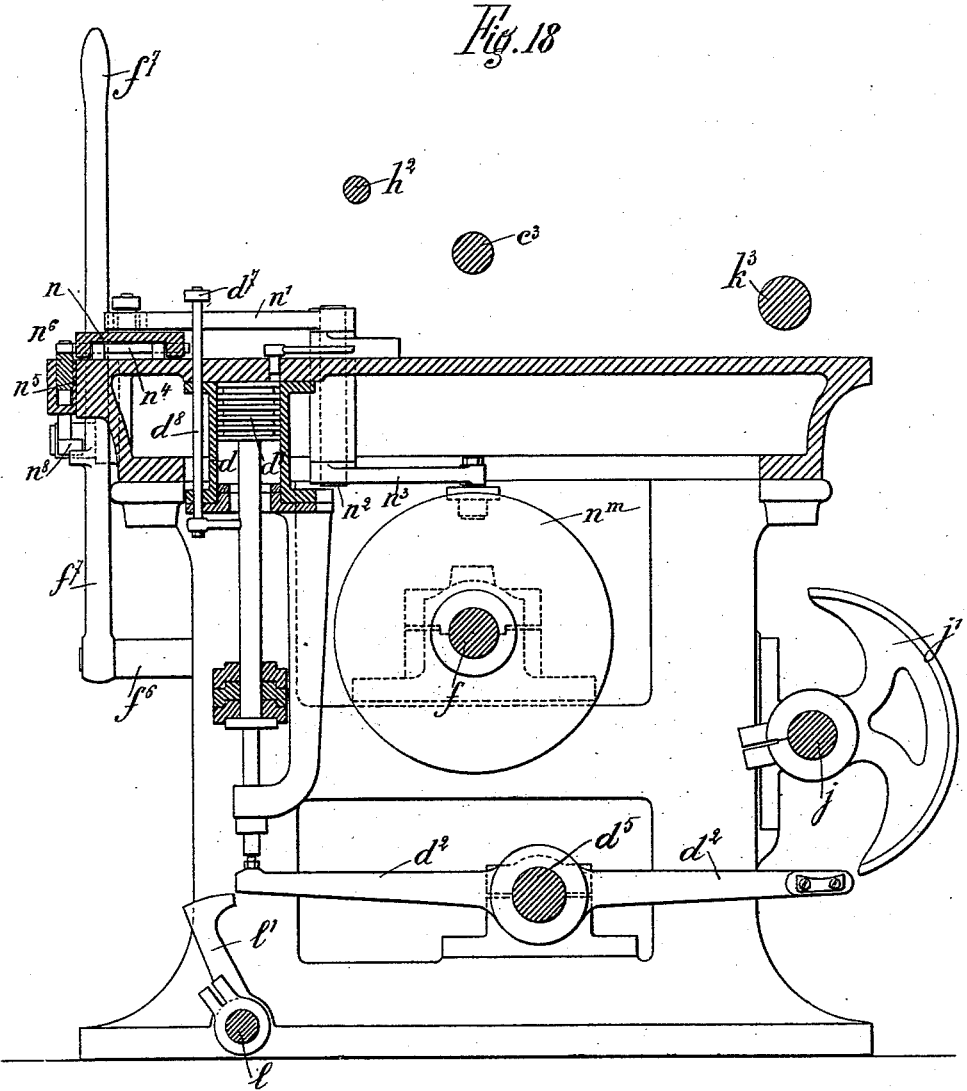
Figure 19:
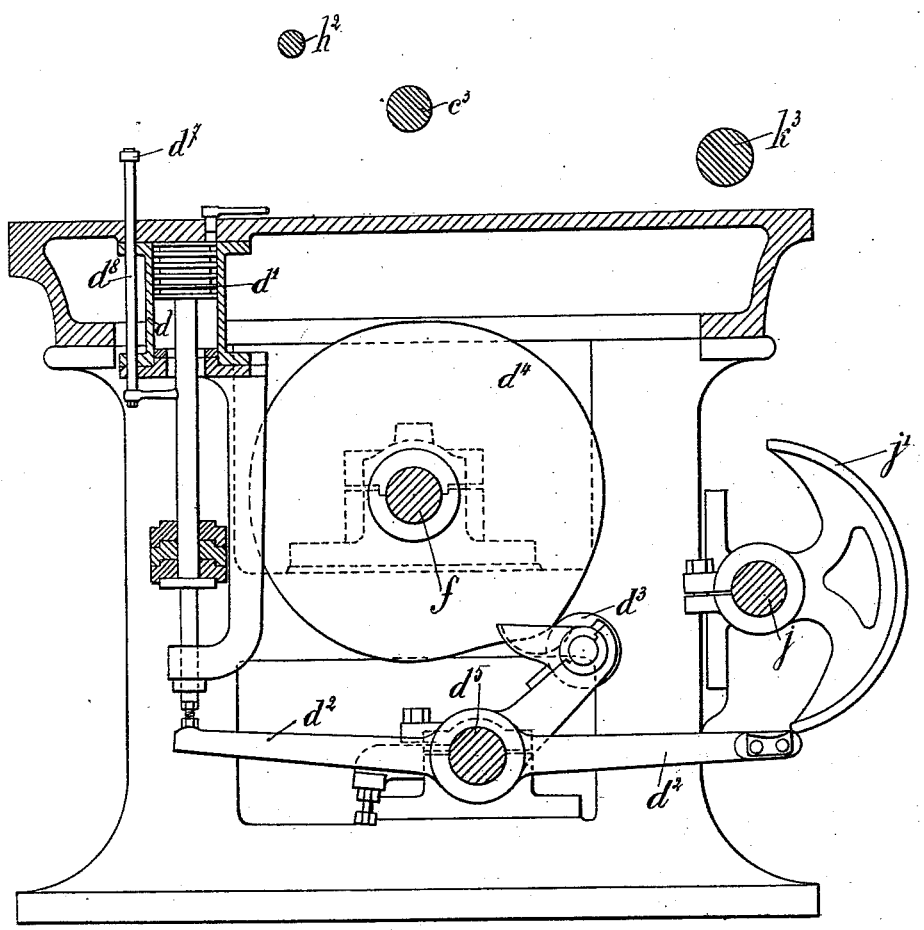
Figure 20:
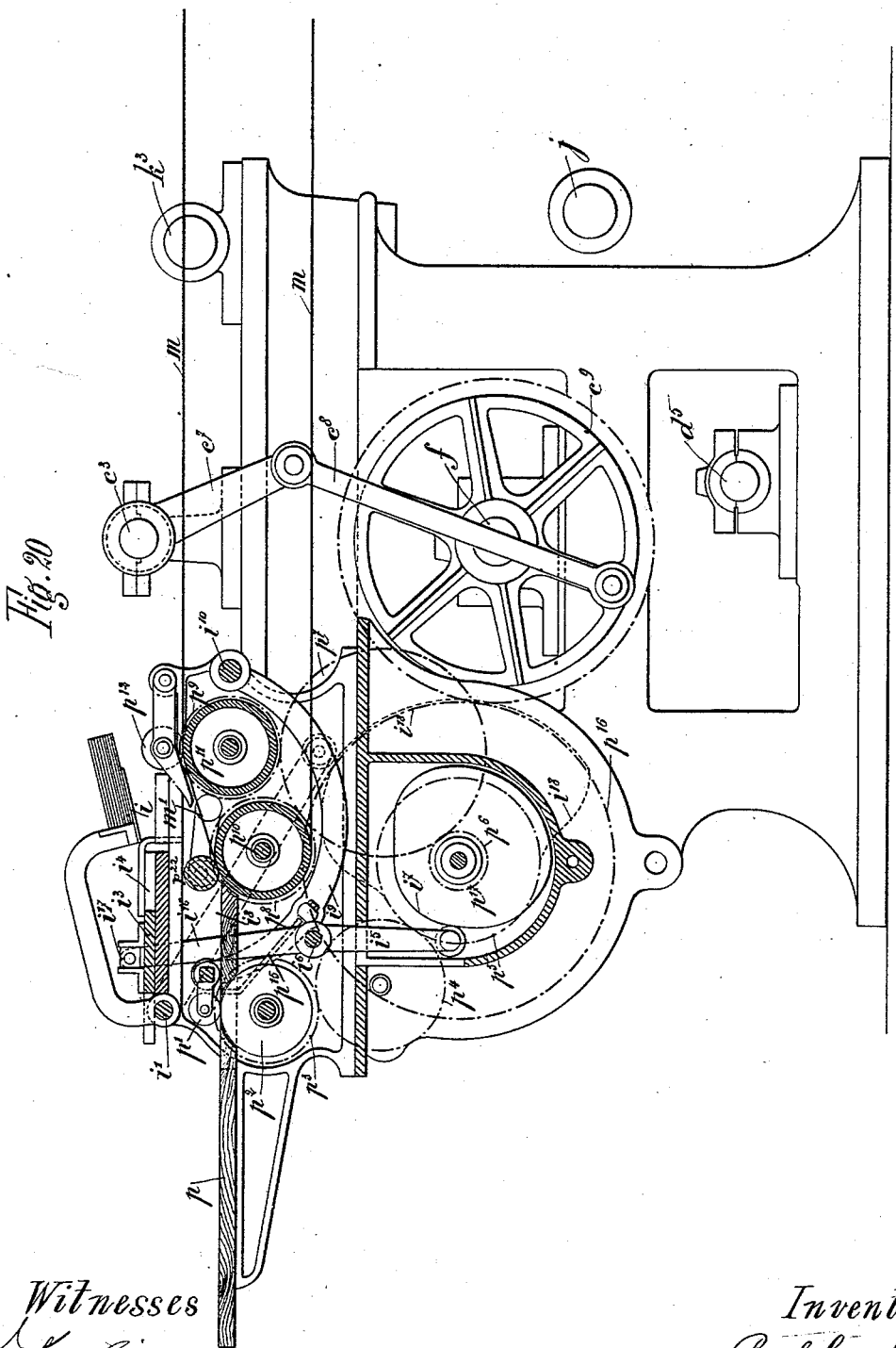
Figure 21:
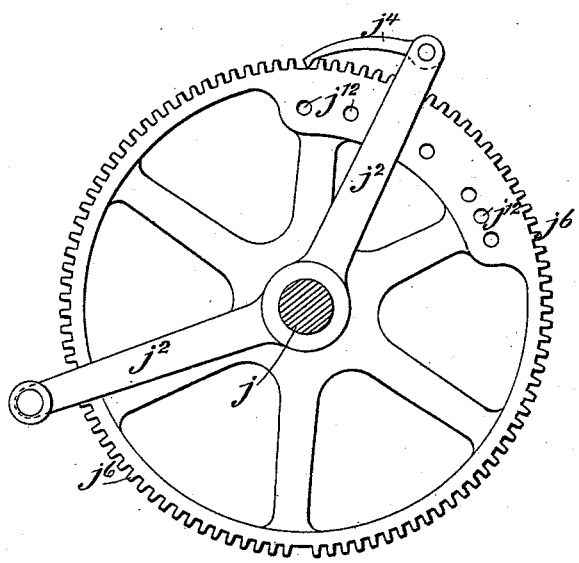

6 is a right-hand end elevation of the machine. Fig. 7 is a plan of the left-hand end of the machine corresponding with Fig. 4. Fig. 8 shows the same part of the machine in longitudinal vertical section in a plane passing through the motor-shaft. Fig. 9 is a longitudinal elevation of the right-hand end of the machine, showing in a vertical section on the line G H, Fig. 6, the mechanism which transports the packs of cards and their envelopes upon the apron. Fig. 10 is a rear elevation, on a larger scale than any of the before-mentioned figures, of two of the movable stops which are placed in front of the card-boxes, and which will be hereinafter more fully described. Fig. 11 is a plan corresponding with Fig. 10, showing also one of the card-boxes. Fig. 12 is a transverse vertical sectional view taken in the line X X of Fig. 10, showing also one of the card-boxes in section. Fig. 13 represents a transverse vertical section corresponding with Fig. 12, but taken in the line Y Y of Fig. 10. Fig. 14 represents a transverse vertical section of the machine in the line Z Z, Fig. 3*, showing the mechanism which actuates the movable stops above mentioned. Fig. 15 represents a transverse vertical section in the line W W of Fig. 8, showing the mechanism which imparts to one of the lateral walls of the card-boxes its periodical displacement. Fig. 16 represents a vertical section taken in the line V V of Fig. 1* and showing the mechanism for effecting the lateral displacement of the rakes hereinafter described. Fig. 17 represents a transverse vertical section in the line U U, Fig. 1, showing the mechanism for communicating to the said rakes their upward and downward oscillatory movement. Fig. 18 represents a transverse vertical section in the line T T, Fig. 3, showing the mechanism which produces the movement of the slide, which throws the machine out of gear in case of any derangement of the operation of the machine. Fig. 19 represents a transverse vertical section in the line S S, Fig. 3*, showing the mechanism which produces the ascent of the vacuum-pistons, which will be hereinafter described. Fig. 20 represents a transverse vertical section, on a larger scale than Fig. 1ª, in the line A B, Fig 1*, looking toward the left and showing the parts in a different position from Fig. 1ª. Fig. 21 is a side view of a toothed wheel and a motor lever and pawl therefor, which are not so fully shown in the other figures.

Similar letters of reference designate corresponding parts in all the figures.

The boxes are each formed of a bottom $a$, inclined at about forty-five degrees, and two vertical walls, carried, respectively, by a lower bar $b$ and an upper bar $b'$. The walls $a'$—that is to say, the left-hand sides of the boxes—are fixed, while the right-hand sides or walls $a^2$ have a reciprocating movement. The walls $a'$ may, however, be adjusted all together with the bar $b$ by means of a screw operated by a button $a^3$ to permit the giving of the boxes the proper width, according to the size of the cards to be distributed. A holder, in which a number of cards of the size of those to be distributed are placed, constitutes a gage to facilitate this adjustment of the width of the boxes. This holder consists of a fixed jaw $a^4$ and a movable jaw $a^{21}$, which are best shown in Fig. 8. This fixed jaw $a^4$ is formed on a bracket $a^{20}$, which is secured to the left of $a^4$, and connected by a rod with the left-hand end of the bar $b$. The right-hand sides $a^2$, which are movable, as I have just mentioned, and which are made solid with the bottoms $a$, are hollowed out in front in such manner as to form two lips or nippers $a^5$, which are faced with india-rubber. These lips are intended to brace the cards against the opposite side of the box in order to hold back the greater part of them in such manner that they will not exert any pressure against a sucker, which is employed to take the cards from the boxes at the moment when the said sucker takes away a card from the box, as will be hereinafter described, a few cards only, separated into a small pack from those in the box, remaining free in front of the box and resting at this time against the sucker. Each sucker is composed of a vacuum-cup or mouth-piece $c$, which is constantly in communication by a flexible india-rubber tube with a vertical cylinder $d$, in which slides with very little friction a piston $d'$, which a lever $d^2$, operated by the main shaft $f$, raises from the bottom of the cylinder and allows afterward to fall. Its fall produces in the cylinder a vacuum, which may be increased by additional weights applied to the piston. The vacuum-cups $c$ are carried by levers $c^2$, oscillating with the shaft $c^3$, and by connecting-rods $c^4$, which produce such a movement that each cup, after having taken a card in an inclined position which it has in the box, (see Figs. 2 and 5,) passes out therefrom almost vertically and places the said card, by turning it over, Fig. 4, upon an inclined plane $g$, upon which the card falls and slides to arrive upon a pack in course of formation. The entrance of air, which destroys the vacuum, and consequently the suction of the card, is produced at the moment when the latter reaches the inclined plane. This entrance of air is determined by the opening of the valve $c^5$, the stem of which comes in contact at this moment with the fixed roller $c^6$, Fig. 4. At the moment when the suction is produced to take the front card the lateral stops $k$, (shown in Figs. 10, 11, 12, and 13, and hereinafter more fully described,) which retain a few of the forward cards, rise a little in order to produce the detachment from the front card of the forward cards immediately behind it. This detachment is rendered easy because, owing to the flexibility of the cards, the front one will be slightly cupped within the cup of the sucker. These stops $k$ descend again afterward to allow the sucked card to pass. (See Fig. 6.) Then, while the sucker continues its movement to deposit this card upon the inclined plane $g$, they rise to their extreme position beyond the position indicated in Fig. 5, pushing back the small pack of cards which they sustain. This small pack, if it were not diminished by the thickness of the sucked card, would then rejoin the large group held by the lips $a^5$ and prevented from moving in the box; but there remains between the two packs a space of the thickness of one card. For this movement the boxes open—that is to say, the walls $a^2$ are moved away from the walls $a'$—sufficiently to relieve the cards from the pressure of the lips $a^5$ and leave them loose. The large group then falls upon the small one and fills the space above mentioned. Then the boxes are closed by the movement of the walls $a^2$ toward those $a'$. The large group is then arrested, and the small group, completed, as has been just mentioned, again rests all alone against the stops $k$, which return to the position shown in Fig. 5, to separate the small group from the large one. It will thus be seen that the small group remains composed of a constant number of cards. At this moment the vacuum-cup, having moved back, sucks a new card, and so on.

The stops $k$, of which I have just explained the purpose, are all mounted upon a straight bar $k'$, to which a cam gives the necessary movements. They are each composed, as shown in Figs. 10, 11, 12, 13, and 14, of a fork placed between two neighboring boxes, and of which the branches, about the height of the middle of the card, are furnished with projections $k^m$, which retain the cards by their side edges. Moreover, the bar $k'$ carries in the center of each box a hook $k^n$, which serves to support the free cards which descend upon it. It results from this that the cards, at the moment when they are sucked, are held only by three points, (two upon the sides and one below,) which form a triangle, near the center of which the sucking-cup is applied, which permits the latter to operate under the best conditions, even if the cards were not exactly flat.

The clamping of the cards is produced simultaneously in all the boxes by means of the upper bar $b'$, which is operated as will be hereinafter described. In order that it should be very regular, the right-hand side of each box is adjustable by means of a button and a nut securing the piece in place when once the adjustment is obtained.

When all the parts of the machine are in operation, as many cards as there are boxes are deposited by each operation of the suckers upon the pack in formation, which rests in front of each box upon the table $h$, seated below the inclined plane $g$. As may be understood, the pack which is at the beginning of the table consists of but a single card, the second pack of two, the third of three, and so on throughout, and to complete these packs it is necessary to make them run the whole length of the table $h$, stopping them exactly in front of each box during the necessary time to receive a card from the sucker. These successive adjustments are given to the pack by vertical blades or rakes $h'$, to which are given a double movement: first, a movement about the shaft $h^2$ to permit them to rise above the table behind the packs which they are intended to push, and to descend again under the table when once the translation is effected the table having in it for this purpose slots for the passage of the rakes; second, a longitudinal reciprocating movement with the shaft $h^2$ to cause them to effect this translation of the packs and to bring them back again to their original position. The last pack of cards, which is a complete pack, since it has received one card from each one of the boxes, is pushed by the rake placed behind it onto a small table $i$, which swings upward on a pivot at its rear end, and is thereby placed in a position to form a prolongation of the table $h$. This small table $i$ afterward falls into a horizontal position, and the pack which it carries is pushed by a small reciprocating carriage onto a horizontal endless apron $m$, running at right angles to the machine, and which takes away the packs to the attendants who are to wrap them up; but before receiving the packs the same apron has received a sheet of paper intended to constitute an envelope or wrapper, in such manner that the pack which is deposited on the small table $i$ is deposited on its wrapper, and that it is in this state that it reaches the attendant. The attendants are placed around a table in the middle of which circulates the apron $m$, which brings the packs of cards to them.

In that which precedes I have supposed the machine to be in full operation and all the boxes distributing their contents; but it will be understood that at the commencement of the operation it is necessary that the first box only should furnish a card, since the cards contained in the following boxes should not form the commencement of a pack, for that would form incomplete packs. They should only deposit their card upon a pack containing all the cards from all the preceding boxes. At the second operation the second box should operate at the same time as the first to place its card on that deposited by the first box at the preceding operation. At the third operation the third box should operate, at the fourth operation the fourth, and so on until the pack with which the work commenced has arrived at the last box. From this time all the parts of the machine will operate together.

I will now describe the means which I employ to produce the successive commencement of operation after the starting of the machine of first one box, then two, three, four, &c. As I have before stated, the vacuum by means of which a sucker takes a card from one box to carry it to the table $h$ is produced by the descent of the piston $d'$ in the cylinder communicating with that sucker. When it is desired that the sucker should not operate, it is sufficient to prevent its piston from descending by stopping the end of its rod. To obtain this stoppage, I place above the levers $d^2$, which correspond in number with the pistons and which serve to raise them, a shaft $j$, upon which are keyed sectors $j'$. These sectors, when they press upon one of the ends of the levers, maintain the other end raised in such manner that the piston thus raised will be at the top of its cylinder until its respective sector is turned sufficiently to escape the lever. According to this, in a machine containing fifty-two boxes, to permit the composition of packs of fifty-two cards, I regulate the giving of each of the fifty-two sectors on their common shaft $j$ in such manner that at each fraction of a movement or rotation performed by the latter after each distribution of cards a new lever $d$ will be liberated by its sector. (See Figs. 3 and 7.) At the moment of the starting of the machine all the levers were stationary. After fifty-one distributions they are all liberated and remain free up to the time when the work is to be stopped. The shaft $j$ is stopped automatically, owing to an arrangement which will be hereinafter described. It must be understood that the suckers whose pistons are rendered inoperative, as has just been described, have no operation except their movement from the box to the receiving-table; but, the suction not being produced, this movement is without any effect.

When the machine is put in operation, it is necessary, as has been just stated, to start the pistons successively from left to right. When it is desired to stop the operation of the machine, it is necessary to do exactly the reverse—that is to say, first to stop the first piston on the left, that which corresponds to the first box, in order not to commence the composing of any new packs, and to complete only those which are in course of composition. The same sectors $j'$ attain this end. As they have made a half-revolution for the purpose at the moment of the starting, their position will be symmetrically reversed, and they will then produce a reverse action, as is necessary. All that is to be done is to put their shaft $j$ in operation in the same direction, as will be hereinafter described. On the other hand, the machine which is constructed to be capable of composing packs of the maximum number of cards (ordinarily fifty-two) should also be capable of serving for smaller packs having, for example, thirty-six or thirty-two cards. That involves the necessity of rendering inoperative a certain number of pistons at the left of the machine. This result is obtained very simply by means of the small sectors $l'$, which are brought under the extremities of the levers $d^2$ belonging to the pistons, which should be immovable, in such manner as to maintain the levers and their pistons constantly raised. As the sectors $l'$ are keyed upon their shaft $l$, at graduated angles, it may be understood that by simply causing the hand-lever $l^2$, keyed upon this shaft, to describe a suitable arc of the circle I may immobilize at a single stroke the desired number of pistons at the left of the machine, so as only to leave in use a number of pistons equal to the number of cards which the complete packs should contain. The placing of these lower sectors $l'$ under the levers $d^2$ is easy, and until the moment when the composition of one sort of pack is finished all these levers are in the position in which they maintain the pistons raised. The sectors $l'$ once being put in position, it is necessary, before commencing the work, to turn by hand the shaft $j$, which carries the sectors $j'$ and the wheel $j^6$, sixteen teeth, if sixteen pistons are immobilized, for example. In this manner, when the machine is afterward put in operation, the lever $d^2$ of the seventeenth piston is liberated at the first stroke by these sectors $j'$. When the last piston at the right has been freed in its turn—that is to say, when all the boxes containing the cards are put in operation—the shaft $j$ stops of itself, as in the case of the complete packs of cards and for the same reason, which will be hereinafter explained. At the moment of stopping the work and to finish the commenced pack before putting the wheel $j^6$ in operation care must be taken to turn it the same distance as at the commencement of the work.

The general operation of the machine being thus indicated, I will describe the manner in which the movements of the different organs are obtained. The motor-shaft $f$ is put in operation by a double cone $f'$. When this cone is in gear with the loose friction-pulley $f^2$, which receives the driving-belt, the cone is fitted to the driving-belt with a feather in such manner that both rotate together, but that the cone may be displaced longitudinally. The cone is constantly pushed toward the right, Figs. 1 and 8, by springs $f^{11}$, located in boxes provided in its hub and having their bearing against a plate $f^{12}$, keyed upon the shaft. It will thus remain in contact with the pulley $f^2$ and the machine would remain in gear if the cone were always free to move toward the right under the action of these springs. Normally, however, this cone is held to the left by a ring $f^3$, surrounding its hub and keyed laterally a little below its center to and between two shaft-sections $f^6$, Fig. 4. The ring carries for this purpose upon the sides two internal projections $f^5$, cast with it and acting a little above the center upon a collar $f^{10}$ on the middle of the cone, which they prevent from advancing toward the right, Fig. 8. One of the shaft-sections $f^6$ also carries the starting-lever $f^7$. To put the machine in gear, it is necessary to push this lever toward the right, which causes the turning of its shaft $f^6$, and consequently the ring $f^3$ swings toward the right and the projections $f^5$ liberate the cone, which then yields immediately to the pressure of the springs $f^{11}$ and is pressed against the pulley $f^2$, which puts the machine in operation. At the same time a catch in the form of an elbow-lever $n^8$, pressed by a spring $n^m$ is caused to fall behind the starting-lever, Fig. 1, and prevented from moving back, so that the lever cannot then throw the machine out of gear.

The throwing out of gear is effected as will be hereinafter described, and it can only take place when the organs are in a determined position. It may be effected by hand, if so desired, or it may be produced automatically in case of one of the boxes containing no more cards, as also in the case of a sucker losing its aspiration. In all cases it always acts in a manner to stop the machine positively, for at the moment of throwing out of gear the double cone $f$ is thrown toward the left into a fixed crown $f^8$, which constitutes a brake. In this way the making of false packs is prevented.

The levers $d^2$, whose duty it is to raise the pistons, are loose upon their shaft $d^5$, and they are raised at the desired moment—that is to say, after each distribution of cards—by the arms $d^6$, keyed on the same shaft, and which receive an oscillating movement by means of an arm terminated by a roller $d^3$, which is operated by a cam $d^4$, mounted upon the driving-shaft, Figs. 1, 2, 3, and 5. It is clear that this system of raising the levers permits the leaving of some of the pistons immovable at the tops of their cylinders, as has been described.

The shaft $c^3$, (see Fig. 6,) which produces the movement of the suckers, is operated by an arm $c^7$, which is keyed to it and which is connected with the free extremity of a connecting-rod $c^8$, articulated to a crank-wrist on a wheel $c^9$, mounted on the right-hand end of the driving-shaft. This wheel is toothed to drive, as will be hereinafter described, the shaft $p^{17}$ of the apparatus for distributing the envelopes.

The stops $k$ are fixed upon a straight bar $k'$, carried by the arms $k^2$ of a shaft $k^3$, which receives an alternative circular motion by means of an arm $k^4$, Fig. 3, terminated by a roller which rolls upon a cam $k^5$, Figs. 1, 1*, and 14.

The slight reciprocating movement which the right-hand walls $a^2$ of the boxes carrying the lips $a^5$ receive is communicated to the bar $b'$, which carries these walls $a^2$ by the following means: The bar $b'$ is articulated to the end of small transverse lever $a^7$, pivoted by a pivot $a^8$, carried by a small column $a^9$ at the left-hand end of the machine. (See Figs. 1, 4, and 8.) This lever $a^7$, at its front and lower end, carries a roller $a^{10}$, engaged between two oblique walls forming a grooved cam $a^{11}$, which is carried by an arm $a^{12}$, Fig. 4. This arm is mounted on the shaft $k^3$. Its movement is produced by an arm $a^{13}$, also mounted upon the shaft $k^3$ and terminated by a roller $a^{14}$, operated upon by a cam $a^{15}$, keyed upon the shaft $f$, Figs. 3, 8, and 15. It may be easily understood that the alternative movement of the cam $a^{11}$ by displacing the roller $a^{10}$ consequently displaces the other end of the lever $a^7$, to which is fixed the bar to which the walls $a^2$ of the boxes are solidly fixed.

The rakes $h'$, for the purpose of causing the advance of the packs in course of formation from one box to another upon the table $h$, require, as I have above explained, two movements—namely, an upward and downward movement and a horizontal movement of translation. The first is produced by the partial rotation of the shaft $h^2$ under the action of its arm $h^3$, Figs. 1 and 5, when the roller terminating this arm is raised or lowered by a small roller $h^4$, carried by the forked upper extremity of an elbow-lever $h^5$, of which the horizontal arm carries a roller which bears against the cam $h^m$, Fig. 1.

In the example represented the machine contains three analogous sets of cams, levers, and rollers, such as are above described, in order to make the movement of the rakes more easy to regulate. As to the movement of translation of said rakes $h'$, that is produced by an upright forked arm $h^7$, keyed upon one end of a horizontal shaft $h^8$, which carries at the other end an arm $h^9$, terminated by a roller which is acted upon by the cam $h^6$, Figs. 1 and 5. The rakes, rising through the slots of the table $h$, afterward descend upon the table, then advance. A little spur $h^n$, furnished on the lower edge of each, slides during the movement of translation in a groove provided in the table in order to better assure the taking of all the cards of the pack upon which each rake acts. During the movement of translation the roller terminating the arm $h^3$ above mentioned moves lengthwise the roller $h^4$. The rakes afterward redescend under the table and return to take their primitive position.

The sectors $j'$, which serve either to liberate successively the pistons from the left to the right of the machine at the moment of putting it in operation or to put them successively out of action at the moment when the work is desired to cease, receive their intermittent rotary motion by means of a pawl $j^4$. Every time this pawl causes the turning of the toothed wheel $j^6$ one tooth one of the levers $d^2$ is liberated by its sector $j'$, or, on the contrary, supported by it, according as it is coming into or going out of operation, and consequently the said sector is at the right or the left hand of the extremity of the lever. This pawl is maintained at the extremity of an elbow-lever $j^2$, of which the other arm is terminated by a roller rolling upon a cam $j^5$, keyed upon a driving-shaft $f$. (See Figs. 3 and 7.) At two diametrically-opposite points a tooth is omitted from the wheel $j^6$, as shown in Fig. 21, leaving two opposite blank spaces. The number of teeth on each half of the wheel between these spaces is equal to the number of sectors $j$ on the machine. Consequently when the said wheel has made a half-revolution the levers of all the pistons will have been successively liberated, or, on the contrary, locked by their sectors, as is necessary, as at this moment all the pistons should operate if at the commencement of the work or all should be stopped if at the end of the work. The motor-pawl $j^4$ being then in one of the blank spaces of the wheel $j^6$, it ceases to produce the advance of the said wheel, and consequently ceases to produce the turning of the shaft $j$, and the parts rest in this condition until the pawl has been re-engaged with the teeth of the wheel, as will be hereinafter explained.

An index with two points $j^7$, which is placed in a suitable angular position upon the toothed wheel $j^6$ by means of two buttons $j^8$, screwing into holes $j^{12}$ in this wheel, determines the commencement of the efficacious action of the pawl. The parts are, in effect, arranged in such manner that if the upper point of this index is placed in contact with the safety-pawl $j^9$ (by turning it to the desired angle and with it the wheel to which it is firmly attached) I bring with certainty such tooth of the wheel as may be desired in front of the moving pawl, which after that, by being put in motion, drives the wheel. The safety-pawl $j^9$ is operated by an upright arm of which the roller $j^{10}$ bears against a cam $j^{11}$, and this pawl is always partially raised when the machine is stopped in such manner that it is always possible during the stoppage to make the wheel advance by means of the index $j^7$ one or more teeth in order to bring in front of the motor-pawl the tooth which it should operate first when it shall be again put in operation.

This is what is done the first time when commencing the packs: The motor-pawl being in a space or blank of the wheel $j^6$ and all the pistons held up, several turns of the machine are first taken to settle the cards. Then the machine is stopped, after which, as I have just stated, the safety-pawl is partially raised. The index $j^7$ is then pushed against the safety-pawl, which places the first tooth of the wheel in front of the motor-pawl. The wheel is then set in motion, and the wheel $j^6$, advancing one tooth at each turn, liberates every time one piston and repeats this until all of the pistons are in operation. At this moment the motor-pawl falls into the second blank space of the wheel, and the machine will thus operate indefinitely with all its pistons.

When it is desired to finish the packs without commencing others, the machine is stopped, the index is again pushed up to the safety-pawl, which is partially raised, and a tooth of the wheel is thus placed in front of the motor-pawl. The machine is again started, the wheel advances, and at each movement it puts out of operation one of the pistons, as has been above stated, until they have all been rendered inoperative. It is easy to see that by the aid of this arrangement of the index, if it should be desired to compose packs not having the maximum number of cards, and if it should be necessary, consequently, to put out of action, for example, the first sixteen pistons, it suffices to fix the index or needle $j^7$ in the necessary holes in order that when this needle has been brought back with the ratchet-wheel in such manner that its point will come against the safety-pawl $j^9$ the motor-pawl $j^4$ should be in gear with the seventeenth tooth. The successive liberation of the pistons will then take place, beginning with the seventeenth and ending with the last, and the machine will operate as though it only contained the boxes situated beyond the sixteenth; but it has been mentioned that as soon as the sucker loses its suction the machine is stopped. Now in the case considered the first sixteen boxes do not contain any cards. The first sixteen suckers then operate without sucking anything, and the machine would be stopped after the first stroke if the pistons of these suckers should remain free to descend like the seventeenth and the following, which would be equivalent to one lost suction. In order that this should not be the case, these pistons are held raised and prevented from descending by means of the small sectors $l'$, as has been hereinabove explained, which I repeat ought to be done before bringing the index $j^7$ against the stop-pawl $j^9$ to insure that all the levers $d^2$ are held raised by their sectors $j'$.

I will now describe the means for automatically throwing the machine out of gear and stopping it to prevent the formation of false packs if the cards in one of the boxes should be exhausted without the attendant having perceived it, or in case of a sucker happening to fail to take its card. In front of the machine there is a small carriage $n$ running on rollers, Figs. 3, 4, and 5, which receives a longitudinally-reciprocating movement, consisting of two movements to the left and an intervening stoppage and one return movement to the right. These different movements are given to the carriage $n$ by means of a horizontal arm $n'$, mounted upon the end of a vertical shaft $n^2$, at the lower end of which is another arm $n^3$, furnished with a roller, which is subject to the action of a cam $n^m$. (See Figs. 3 and 18.) In this carriage $n$ slide transversely a series of bolts $n^4$, having at their ends reverse inclined planes. A straight bar $n^5$ is arranged to slide in front of the machine and carries on its upper part as many rollers $n^6$ with vertical axes and as many projections $n^n$ as there are bolts. If there is nothing abnormal in the operation of the machine, the bolts may move with the carriage $n$ without passing out from the mortises which receive them, and consequently without having any effect on the bar $n^5$; but it is otherwise if the cards give out in one of the boxes, as will be presently explained.

It is clear that if one of the cups $e$ does not meet with any card in front of it to close its opening the descent of the corresponding piston in its cylinder will not produce any vacuum. Consequently this piston, instead of being stopped after a very small descending movement by the reduction of pressure above it, as occurs normally, will immediately descend to the bottom of its cylinder. Consequently a roller $d^7$, situated on the upper part of a small rod $d^8$, attached to the rod proper of this piston, falls just above the table of the machine, as shown in Fig. 4, at the height of the bolts $n^4$. Now between the roller $d^7$ of the pistons and the roller $n^6$ of the bar $n^5$, above mentioned, there is not the length of a bolt. Consequently, the bolt situated immediately to the right of the roller $d^7$, which has fallen, will meet this roller with its posterior inclined plane as soon as the carriage is moved toward the left, and during the first part of this movement of the carriage this bolt will be pushed toward the front of the machine, and its front extremity will be brought in front of a projection $n\ n$ on the bar $n^5$. Consequently, when the carriage will have accomplished the second part of its movement toward the left, this bar, the sliding of which in its guides is facilitated by rollers, will be carried with it. The said bar operates in its turn the vertical arms of the catch $n^8$, above mentioned, which serves to lock the lever $n^7$ in the position for keeping the machine in gear, Fig. 1. The throwing out of gear is thus produced under the action of a spring $n^9$, (see Fig. 1,) which is more powerful than the springs $f^{11}$, pressing against the disengaging-bar $n^*$, which presses against the lever $f^7$. The entire machine is thus instantly stopped because the double cone $f'$ is pressed into the fixed crown $f^8$, which serves as a brake. This instantaneity is indispensable, as may be understood, to prevent the making of false packs. Moreover, the machine, by being thus stopped, leaves positively all its parts in a determined position always the same, since the throwing out of gear can only take place at the end of the movement of the carriage $n$ to the left, which corresponds with a perfectly-completed phase of the operation.

When it is desired to effect the throwing out of gear by hand, it is sufficient to pull out, by means of a button with which certain of them are provided, one of the bolts $n^4$, which causes the bar $n^5$ to effect the automatic throwing out of gear, but not until the proper moment has arrived. This moment is that at which an operation is completely finished and when another is about to commence. At this moment, as may be understood and as has been above stated, the safety-pawl is partially raised to permit the passage of the teeth of the ratchet-wheel, while remaining low enough to continue to serve as a stop to the index carried by this wheel. The bolt which is thus advanced in its mortise is put back in place at the following stroke of the machine by the striking of its front inclined plane upon one of the rollers $n^6$ of the bar $n^5$ during the return of the carriage $n$ to the right. By looking to ascertain which is the bolt which is thrown out it will be known where to find the derangement which has caused the stoppage of the machine.

The mechanism for the transport of the complete packs will be easily understood by reference to the drawings, and particularly to Figs. 1, 1*, 1ª, 3, 6, and 9. As has been stated, a small forked table $i$, fixed to a C-shaped piece swinging about a horizontal pivot $i'$, is raised at the desired moment in such manner as to be placed in the prolongation of the table $h$, and the pack of cards which has just been completed is pushed upon this table $i$ by the last rake $h'$ and comes against the stop $i^2$, adjustable by means of a button, and serving to arrange the pack and to determine exactly its position. To avoid any possibility of accident, this stop has a spring applied to it. The table is then replaced horizontally to bring the pack to the level of the transverse endless apron $m$. In this position the pack is pushed upon the apron, or rather upon an envelope deposited previously upon the latter, as has been hereinbefore explained, by a small carriage $i^3$, movable in slides $i^4$ and operated by a lever $i^5$. This lever is terminated at the lower end by a roller, which is operated by a cam $i^7$. It imparts a partial rotary motion to a shaft $i^6$, which carries two arms $i^{16}$, connected at their upper parts by a rod $i^{17}$, which drives the carriage.

The desired oscillating movement of the small table $i$ is given to its shaft $i'$ by a lever $i^8$, operated by a cam $i^{18}$. Two curved arms $i^9$, one on each side, are keyed upon a horizontal shaft $i^{10}$, around which is pivoted a system composed of a hollow arm or socket $i^{11}$, terminated by a transverse arm, and of the arm $i^{12}$, carrying at its extremity a roller which bears upon a cam $i^{13}$.

The relative position of the arms $i^{11}$ and $i^{12}$ is regulated by turning, by means of an upper button, a screw $i^{14}$, inclosed in a socket and gearing with a small sector $i^{15}$ (see Fig. 6) fast to the arm $i^{12}$. It will be understood that by these means the arm $i^{12}$ may be turned in such manner as to vary the angle between the pieces $i^{11}$ and $i^{12}$. That being understood, it is clear that when the operating-face of the cam $i^{13}$ has just raised the roller the socket $i^{11}$ and its shaft make a small angular movement, which is also participated in by the bent arms $i^9$, and that this movement will be produced earlier or later, according to the position given to the roller by means of the regulating-screw. This operation is necessary because of the different sizes of wrappers that may have to be employed.

I will now describe how the sheet of paper intended to form the wrapper of the pack is placed upon the apron before the pack is to be pushed upon it by the carriage $i^3$. One of the wrappers, which are kept piled upon the table $p$, is passed by the attendant between the small upper roller $p'$, raised at this moment by the curved arms $i^9$, and the lower roller $p^2$, to which there is given a rapid rotary motion by gears $p^3$ $p^4$ $p^5$. This latter gear is mounted upon a shaft $p^{17}$, which is put in rotation by a gear $p^{16}$, driven by the gears $c^9$ upon the main shaft $f$. The wrapper is thus brought to an inclined portion $m'$ of the apron $m$, which is carried by two rollers $p^{10}$ $p^{11}$, the gears $p^8$ and $p^9$ on the shafts of which are driven by a gear $p^7$, gearing with a pinion $p^6$, fast upon the shaft $p^{17}$. The sheet is held upon the apron first by a roller $p^{22}$, then by rollers $p^{12}$ $p^{13}$ and by the beaks of the arms which carry these rollers, one of these systems pressing upon the left-hand border and the other upon the right-hand border, while providing for the passage of the pack of cards between them. The curved arms $i^9$ carry rods $p^{15}$, which are raised at the same time with them and rise to a little above the roller $p^2$, above mentioned, to which the attendant presents the envelope in such manner as to constitute register-pins to enable the wrappers to be always placed in the same position. The putting of these envelopes in place might, however, be done mechanically by the machine.

It is easy to see that the machine hereinabove described may serve not only to compose packs of playing-cards, but also to group methodically in packs or packages all objects analogous to playing-cards—such as chromolithographs, &c.—of all forms and dimensions. The number of boxes not being limited, the number of cards or other objects composing each package need not be limited.

What I claim as my invention, and desire to secure by Letters Patent, is—

1. The combination, in a machine for composing playing-cards and other analogous collections, of a series of boxes arranged in a row for containing separately the cards of the several denominations, a stationary table opposite said row of boxes, a series of oscillating suction card-carrying devices for taking the cards singly from said boxes and carrying them to a position whence they may fall to said table, and a series of rakes having a rising-and-falling motion and a reciprocating motion for the purpose of moving along the said table the cards deposited thereon from one box to a position opposite the next box, all substantially as herein described, and for the purpose set forth.

2. The combination, in a machine for composing packs of cards or other analogous collections, of a series of card-boxes, a series of cylinders and suction-cups, one cylinder and cup for each box, pistons working in said cylinders and having their rods projecting therefrom, and a clutch on the driving-shaft of the said machine, an automatic apparatus for throwing the machine out of gear, composed of the carriage $n$, the upright shafts $n^2$, and the arms $n'$ $n^3$, attached to said shaft, and the cam $n^m$ for operating said carriage, the series of transverse sliding bolts $n^4$, the bar $n^5$, carrying rollers $n^6$ and stops $n^n$, and the rods $d^8$, attached to the piston-rods and each carrying a roller $d^7$, the whole serving to displace a catch $n^8$, which maintains the clutch in gear, essentially as hereinabove described.

3. The combination, in a machine for composing playing-cards and other analogous collections, of an endless apron for receiving the completed packs and mechanism for placing a wrapper on said apron before each pack of cards is deposited thereon, said mechanism consisting of the shaft $i^{10}$, the socket $i^{11}$, attached to said shaft, and the screw $i^{14}$, contained in said socket, the arms $i^{12}$, carrying at one end a toothed sector $i^{15}$ and at the other a roller, the cam $i^{13}$, the bent arms $i^9$, the table $p$, the rollers $p'$ $p^2$, the gears $p^3$ $p^4$ $p^5$, the shaft $p^{17}$, geared with the driving-shaft by means of gears $c^9$ and $p^{16}$, the inclined portion $m'$ of the table $m$, carried by the rollers $p^{10}$ and $p^{11}$, the gears $p^6$ $p^7$ $p^8$ $p^9$, the rollers $p^{12}$ $p^{13}$, and the rods $p^{15}$ $p^{16}$, serving as register-pins for the sheet which is placed between the rollers $p'$ and $p^2$, all essentially as herein described.

4. In a machine for composing packs of playing-cards or other analogous collections, the combination of a series of boxes for containing the cards or other units, each having an inclined bottom $a$, two upright walls, of which one $a'$ is fixed, but adjustable, and the other $d^2$, having elastic lips at its front end, is capable of a reciprocating motion, a bar to which the last-mentioned walls $a^2$ are all attached, and means, substantially as herein described, of giving the said bar and attached walls a reciprocating motion for the purpose of alternately clamping the cards in the boxes and liberating them at proper intervals, all substantially as herein described.

5. In a machine for composing playing-cards or other analogous collections, the combination, with a box for containing cards and an inclined plane upon which the cards taken singly from the said boxes are to be deposited, of the card-carrying apparatus consisting of an oscillating shaft and attached lever and mouth-piece provided with a valve, a stationary cylinder containing a gravitating piston, a flexible connection between said mouth-piece and cylinder, and means, substantially as herein described, of opening said valve, all substantially as herein set forth.

6. In a machine for composing packs of cards or other analogous collections, the combination, with a table on which the packs are composed and an endless apron which carries the completed packs to the attendants for wrapping, of the mechanism herein described for transferring the completed packs from said table to said apron, said mechanism consisting of the last one of the series of rakes $h'$, moving lengthwise of the said table, the small oscillating table $i$, the adjustable spring-stop $i^2$, the carriage $i^3$, and means of operating the said rake, oscillating table, stop, and carriage, all substantially as herein set forth.

7. The combination, with the cylinder $d$ and pistons $d'$ of the card-carrying apparatus, of the levers $d^2$ and the shaft $d^5$, upon which said levers are loosely placed for lifting the said pistons, the arms $d^6$, one for each lever, fast upon the said shaft, the arm carrying the roller $d^3$, also fast upon said shaft, and the cam $d^6$ upon the main shaft, all substantially as and for the purpose herein described.

8. The combination, with the cylinders $d$ and pistons $d'$ of the card-carrying apparatus and the levers $d^2$, for lifting said pistons, of a series of sectors $j'$, one for each lever, and the shaft $j$, common to all of said sectors, the ratchet-wheel $j^6$, fast on said shaft, the elbow-lever $j^2$, loose on said shaft, the pawl $j^4$, carried by said elbow-lever and engaging with the ratchet-wheel, the cam $j^5$ on the main shaft for operating said elbow-lever, the safety-pawl $j^9$ and its carrying-lever loose on said shaft $j$, the cam $j^{11}$ on the main shaft for operating said safety-pawl, and the two-pointed index adjustably secured to the said ratchet-wheel, all substantially as herein described, for the purpose of liberating the pistons successively or (on the contrary) of rendering them inoperative at the commencement and the end of the work, respectively, as herein set forth.

9. The combination, with the cylinder and pistons of the card-carrying apparatus, of the horizontal shaft $l$, the sectors $l'$, spirally-arranged thereon, and the hand-lever $l^2$, for operating the said shaft for the purpose of maintaining raised as many of the pistons as are at any time to be rendered inoperative in composing packs or collections not having the maximum number for which the machine is constructed, substantially as herein set forth.

10. In a machine for composing playing-cards or other analogous collections, the combination, with the main shaft $f$, of the mechanism herein described for throwing the machine out of gear and stopping it, consisting of the double cone $f'$, fitted to slide on a feather on the said shaft, to rotate with the said shaft, and to move thereon longitudinally, the loose internally-coned friction-pulley $f^2$, the spring $f^{11}$, the ring $f^3$ and its shafts $f^6$ and projections $f^5$, the collar $f$, the fixed internally-coned crown $f^8$, serving as a brake, the lever $f^7$, the catch $n^8$, and the spring $n^9$, all substantially as described.

In testimony whereof I have signed this specification in the presence of two subscribing witnesses.

PAUL GAUCHOT.

Witnesses:
ROBT. M. HOOPER,
CHARLES ASSI.